United States Patent
Garlapati et al.

(10) Patent No.: US 11,126,513 B2
(45) Date of Patent: Sep. 21, 2021

(54) DISASTER RECOVERY SERVICE

(71) Applicant: Amazon Technologies, Inc., Seattle, WA (US)

(72) Inventors: Vikram Garlapati, Redmond, WA (US); Craig Keith Carl, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 16/036,679

(22) Filed: Jul. 16, 2018

(65) Prior Publication Data

US 2018/0322022 A1 Nov. 8, 2018

Related U.S. Application Data

(63) Continuation of application No. 15/043,127, filed on Feb. 12, 2016, now Pat. No. 10,025,679, which is a
(Continued)

(51) Int. Cl.
*G06F 11/00* (2006.01)
*G06F 11/20* (2006.01)
*G06F 11/16* (2006.01)

(52) U.S. Cl.
CPC .......... *G06F 11/2033* (2013.01); *G06F 11/16* (2013.01); *G06F 11/1658* (2013.01); *G06F 11/2002* (2013.01); *G06F 11/2023* (2013.01); *G06F 11/2028* (2013.01); *G06F 11/2038* (2013.01); *G06F 11/2048* (2013.01);
(Continued)

(58) Field of Classification Search
CPC .. G06F 11/2033; G06F 11/16; G06F 11/1658; G06F 11/2002; G06F 11/2023; G06F 11/2028; G06F 11/2038; G06F 11/2048; G06F 11/2094; G06F 11/1675; G06F 11/20; G06F 11/2025; G06F 11/2053; G06F 11/2082; G06F 11/0712; G06F 11/1416; G06F 2201/805; G06F 2201/815
See application file for complete search history.

(56) References Cited

U.S. PATENT DOCUMENTS 6,266,784 B1 * 7/2001 Hsiao .................. G06F 11/1451
714/5.11
8,103,906 B1 1/2012 Alibakhsh et al.
(Continued)

*Primary Examiner* — Joseph D Manoskey
(74) *Attorney, Agent, or Firm* — Davis Wright Tremaine LLP

(57) ABSTRACT

A customer may use a disaster recovery service to generate a disaster recovery scenario in order to make certain resources available to the customer in the event of a data region failure. The customer may specify a recovery point objective, a recovery time objective and a recovery data region for the scenario. Accordingly, the disaster recovery service may coordinate with one or more other services provided by the computing resource service provider to reproduce the customer resources and other resources necessary to support the customer resources. These reproduced resources may be transferred to the recovery data region based at least in part on the parameters specified by the customer. In the event of a data region failure, the disaster recovery service may update the domain name system to resolve any customer requests for the customer resources to the recovery data region.

20 Claims, 11 Drawing Sheets

Related U.S. Application Data continuation of application No. 14/034,418, filed on Sep. 23, 2013, now Pat. No. 9,274,903.

(52) U.S. Cl.
CPC .... *G06F 11/2094* (2013.01); *G06F 2201/805* (2013.01); *G06F 2201/815* (2013.01)

(56) References Cited

U.S. PATENT DOCUMENTS

| | | | |
|---|---|---|---|
| 8,332,354 B1 | 12/2012 | Chatterjee et al. | |
| 8,566,549 B1 | 10/2013 | Burke et al. | |
| 8,839,031 B2 | 9/2014 | Das et al. | |
| 9,020,895 B1* | 4/2015 | Rajashekar | G06F 16/128 |
| | | | 707/639 |
| 9,274,903 B1 | 3/2016 | Garlapati et al. | |
| 9,430,335 B2 | 8/2016 | Jin et al. | |
| 2005/0223271 A1 | 10/2005 | Butterworth et al. | |
| 2007/0055914 A1 | 3/2007 | Chandwani et al. | |
| 2009/0150456 A1 | 6/2009 | Balasubramanian et al. | |
| 2009/0307166 A1* | 12/2009 | Routray | G06N 5/04 |
| | | | 706/46 |
| 2009/0313626 A1 | 12/2009 | Dawson et al. | |
| 2012/0023209 A1 | 1/2012 | Fletcher et al. | |
| 2012/0137173 A1 | 5/2012 | Burshan et al. | |
| 2012/0192006 A1 | 7/2012 | Qi et al. | |
| 2012/0303999 A1 | 11/2012 | Calder et al. | |
| 2013/0036323 A1 | 2/2013 | Goose et al. | |
| 2013/0263122 A1 | 10/2013 | Levijarvi et al. | |
| 2014/0100913 A1* | 4/2014 | Backer | G06Q 10/06 |
| | | | 705/7.28 |
| 2015/0019901 A1* | 1/2015 | Griffith | G06F 11/2048 |
| | | | 714/4.11 |

* cited by examiner

DISASTER RECOVERY SERVICE

CROSS REFERENCE TO RELATED APPLICATIONS

This application is a continuation of U.S. application Ser. No. 15/043,127, filed Feb. 12, 2016, entitled "DISASTER RECOVERY SERVICE," which is a continuation of U.S. application Ser. No. 14/034,418, filed Sep. 23, 2013, now U.S. Pat. No. 9,274,903, entitled "DISASTER RECOVERY SERVICE," the content of which are incorporated by reference herein in their entirety.

BACKGROUND

Computing resource service providers and other service providers often grant users access to one or more services to support the users' business needs. These services may be maintained and operated in multiple data regions, enabling users to select a data region for accessing these services, which may potentially reduce latency and provide higher throughput to each user of these services. Despite their many advantages, the use of these data regions may present some risks that are borne by the computing resource service provider and the organizations that utilize them. For example, despite their best efforts to avoid it, these data regions may be susceptible to natural disasters and other events that can cause failures that may result in significant downtime and data loss. Currently, the organizations that utilize these services through a data region utilize various tools and mechanisms for disaster recovery scenarios. For instance, these organizations may duplicate their data manually to a number of data regions in order to have adequate redundancy in the event of a data region failure. Generally, the management and execution of adequate failover plans can be complex and, as a result, difficult to manage.

BRIEF DESCRIPTION OF THE DRAWINGS

Various embodiments in accordance with the present disclosure will be described with reference to the drawings, in which.

DETAILED DESCRIPTION

Figure 1:
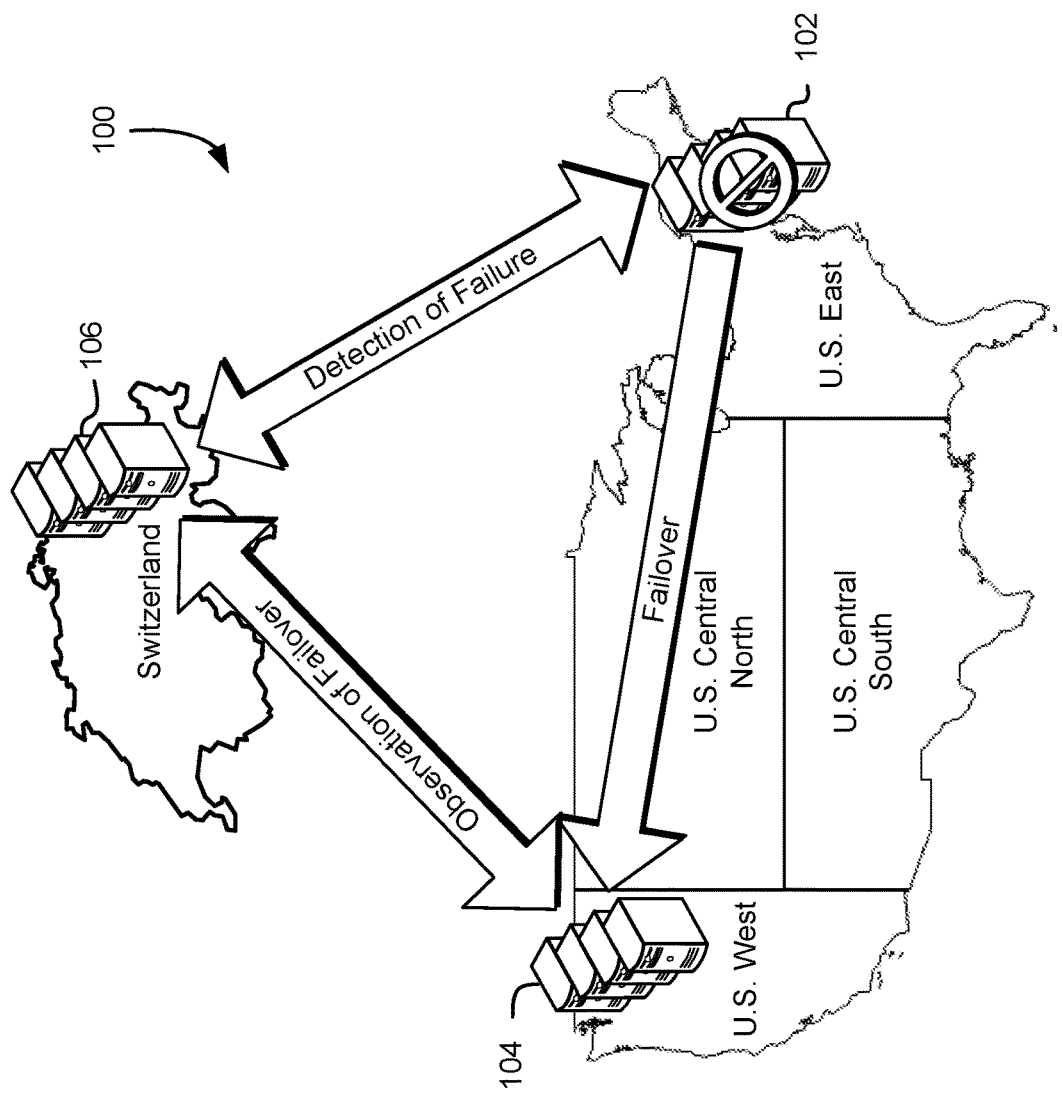
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a disaster recovery service provided by a computing resource service provider where the disaster recovery service coordinates various computing resource services to prepare a failover and failover itself from one region to another, thereby providing continued availability of computing resources provided by one or more services in the event of a data region failure. In an embodiment, an entity (e.g., an organization) may communicate with a disaster recovery service, such as through one or more appropriately configured application programming interface (API) calls to the service, to request creation of a disaster recovery scenario that may, for example, be utilized to restore availability of data that may have become unavailable as a result of a failure at a data region. The entity may be a customer of a computing resource service provider that operates various services such as a virtual computer system service, object-based data storage services, database services, the aforementioned disaster recovery service and a plurality of other services.

When a disaster recovery scenario is created, the disaster recovery service may coordinate preparation for failover by, at least in part, transmitting one or more executable instructions to the appropriate services specified by the entity to initiate a replication process. In some embodiments, the disaster recovery scenario includes a recovery point objective (RPO) period and a recovery time objective (RTO) period for resumption of data availability in an alternative data region after a failure in the original data region comprising customer data. The disaster recovery service may be configured to transmit executable instructions to the various services that the customer may be utilizing to replicate and transmit the customer data to an alternative data region in accordance with the specified RPO and RTO. For instance, the executable instructions may cause the various services to perform an initial replication of the computing resources used by the customer and, at a later time, update the replication process such that, in the event of a data region failure, the failover process may be able to occur in accordance with the RPO and RTO. Such replication and maintenance of resources may be performed such that the replicated resources maintain any dependencies from one another consistent with the resources that are replicated.

In some embodiments, an entity interfaces with the disaster recovery service through a graphical user interface (GUI) configured to transmit one or more appropriately configured API calls to the service to specify the parameters for the disaster recovery scenario. For instance, an entity may use the GUI to specify the RPO, RTO and alternative data region to be utilized in the event of a failure. Additionally, the entity may interface with the disaster recovery service through a GUI to specify the one or more resources that are to be replicated and redundantly stored within the alternative data region specified. If the entity provides valid entries for the RPO, RTO, alternative data region and resources that are to be the bases for the disaster recovery scenario, a management sub-system within the disaster recovery service may be configured to use these entries to generate and transmit the executable instructions noted above to the applicable services specified by the entity. Other parameters for a disaster recovery scenario include various parameters specifying various relationships (e.g., resource dependencies) among resources so that such relationships are preserved in the case of failover.

In various embodiments, once the disaster recovery scenario has been created, the disaster recovery service is configured to allow an entity to test the scenario to ensure that the implementation of the scenario is adequate. For instance, the entity may interact with the disaster recovery service through the GUI to transmit one or more appropriately configured API calls to the service to initialize a failover test. Accordingly, the disaster recovery service may be configured to access the alternative data region specified during the creation of the scenario and modify any entity requests to access the various services provided by the computing resource service provider such that the requests are addressed to this alternative data region. This may allow the entity to access the replicated data in this alternative data region. Additionally, the entity may initiate a failover test to ensure that the reproduced data is available in the event of a failover event. The disaster recovery service may be configured to track any relevant metrics in order to verify that the failover has been performed successfully according to the entity specifications for the scenario.

In an embodiment, the disaster recovery service is operated and maintained in an objective data region apart from the original data region comprising the entity data and from the alternative data region used for replication of the entity data. For instance, the disaster recovery service may be configured to interact with the applicable services in the original data region to transmit one or more executable instructions to these services to replicate the entity resources and transfer these replicated resources to an alternative data region. Additionally, the disaster recovery service may be configured to interact with the alternative data region to verify that the replicated resources are available and to test the failover upon entity request. This may prevent the disaster recovery service from interfering with the operations necessary to failover from the original region to the alternate region. Thus, the disaster recovery service may be configured to act as a witness to the operations taking place, tracking these operations and providing updates and metrics to the entity.

In an embodiment, the disaster recovery service is configured to coordinate the failover of any disparate resources to the alternative data region in order to preserve dependencies among the entity data. For instance, the disaster recovery service may coordinate the various services for each entity to ensure that, upon failover, the transferred resources are available with minimal interruption. For example, the disaster recovery service may be configured to transmit a set of executable instructions to an object-based data storage service that may cause the service to replicate and transfer one or more logical data containers to the alternative data region prior to replication and transfer of a virtual machine instance which may rely on the one or more logical data containers to the alternative data region. This may allow the entity to utilize the replicated instance in this alternative data region upon a failure event.

In this manner, an entity may be able to create a disaster recovery scenario that may be used to restore the entity's data and services necessary to support its business needs. In addition, the techniques described and suggested herein facilitate additional technical advantages. For example, because the creation of the disaster recovery scenario may include coordinating one or more resources in the alternative data region, this may enable the services on the alternative data region to have the resources necessary to successfully implement the failover according to the entity's existing service and resource configurations. This, in turn, may reduce the potential downtime resulting from a data region failure and enable the disaster recovery service to more efficiently comply with the entity-specified RPO and RTO time periods.

FIG. 1 shows an illustrative example of an environment 100 in which various embodiments may be practiced. In the environment 100, a computing resource service provider provides various computing resource services to customers of the computing resource service provider. The computing resource service provider may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource service provider may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

These services may be hosted in multiple locations worldwide in order to support a variety of customers that may want to operate these services from varied locations. Each location may comprise a number of data regions and one or more data zones. A data zone may be an independent section of a data center that may add redundancy and fault tolerance to a particular location. Each data region may comprise one or more partitions of the data zones which may be used to further allocate resources to the customers utilizing one or more services provided by the computing resource service provider. For instance, a customer or other entity may be able to access these data zones through the one or more services provided by the computing resource service provider. For example, a customer may use a customer interface to access a virtual machine instance hosted in a particular data zone. Alternatively, a computing resource or customer application may be configured to communicate with the customer interface in order to access these data zones on the customer's behalf.

Accordingly, as illustrated in FIG. 1, the environment 100 includes a number of data regions 102, 104, and 106 configured to provide one or more services to customers in a variety of geographic locations. In the environment 100, a customer of the computing resource service provider may interact with an original data region 102 provided by the computing resource service provider to utilize one or more services. For example, the customer may interact with an object-based data storage service to generate one or more logical data containers for the persistent storage of data. Accordingly, the customer may maintain critical or sensitive data within the original data region 102 that may be difficult to reconstruct or recover in the event of a failure in the original data region. While certain geographic jurisdictions are shown for illustration in the present disclosure, the geographic jurisdictions can be different and, in some embodiments, can all be within a particular country's jurisdiction.

Accordingly, the customer may interact with a disaster recovery service provided by the computing resource service provider in order to reproduce this data and transfer this data to an alternative data region 104. The disaster recovery service may be managed and operated in a variety of data regions. However, the computing resource service provider may configure a domain name system (DNS) service to resolve a customer request to access the disaster recovery service to a separate, objective data region 106. The use of an objective data region 106 for the disaster recovery service may prevent the loss or unavailability of the service in the event of a failure of the original data region 102 or in the event of a lack of resources resulting from the reproduction of data in the alternative data region 104. Accordingly, the disaster recovery service may be configured to determine the original data region 102 comprising the customer's resources and the alternative data region 104 that is to be used to provide the host of services and make the resources available in the event of a region failure. This may allow the disaster recovery service to determine which data region may serve as the objective data region 106 upon a failover scenario. While the use of a single objective data region 106 is used throughout the present disclosure for the purpose of illustration, the computing resource service provider may configure more than one objective data region for monitoring and detecting data region failures. For instance, the computing resource service provider may use multiple objective data regions in order to establish, such as through a quorum of the multiple objective data regions, that a data region failure has occurred.

The computing resource service provider may configure the disaster recovery service to provide a graphical user interface (GUI) to the customer such that the customer may specify certain parameters for the failover scenario. For instance, the customer may use the GUI to specify a recovery point objective (RPO) time, which may correspond to the maximum tolerable period in which customer data may be lost due to a region failure. For example, a customer may specify that he/she may be able to withstand a four minute loss of data. Additionally, the customer may specify a corresponding recovery time objective (RTO), which may correspond to the duration of time within which the data must be restored after a region failure in order to avoid significant impact to the customer's operations. The customer may also use the GUI to specify the alternative data region 104 that may be used to support this failover scenario, namely the host for the variety of services and resources the customer may currently rely on in the original data region 102. For some sets of computing resources, parameters for a failover scenario may specify dependencies among the various resources potentially involved in a failover. For example, a resource provided by one service (e.g., virtual computer system service) may rely on resources provided by another service (e.g., certain data objects stored by a data storage service). Such relationships may be represented by an appropriate data structure, such as a data structure that encodes a directed acyclic graph (DAG) with nodes representing specific resources and edges representing dependencies, with the direction of an edge between two nodes specifying which resource represented by a node depends on the other resource represented by the other node. Accordingly, the customer may specify a number of services and resources that should be included in the failover scenario in order to support its business in the event of a region failure.

Once the customer has completed generating the failover scenario, the disaster recovery service may transmit one or more executable instructions to the affected services in order to coordinate and begin the reproduction of the specified resources. Accordingly, the affected services may perform the reproduction of these resources according to the present configuration of the services. For instance, a virtual computing system service may be configured to generate a snapshot of an existing virtual machine instance and transmit this snapshot to a host slot in the alternative data region 104 for instantiation. In an embodiment, the disaster recovery service is configured to transmit these instructions in a manner that may provide a level of precedence and relationships between the affected services. For instance, the disaster recovery service may provide executable instructions to a database service to reproduce and transmit one or more databases necessary for management of a virtual machine instance to the alternative data region 104 prior to the transmission of the virtual machine instance itself.

As illustrated in FIG. 1, at some time, the original data region 102 may become unavailable due to a failure (e.g., system failure, natural disaster, terrorism, excessive latency in one or more data zones, etc.). Accordingly, a disaster recovery service within an objective data region 106 may be configured to detect a failure of the original data region 102 and initiate the failover process to restore customer access to the one or more services and availability of the resources included in the failover scenario. The disaster recovery service may be configured to interact with a DNS service to process any customer requests to access these services and resources and resolve them to the services and resources provided in an alternative data region 104. Additionally, the disaster recovery service may be configured to observe and coordinate the failover process to ensure that the services and resources are made available according to the particular customer-set parameters and according to the dependencies among the services and resources. Thus, in the event of a failure of the original data region 102, the customer may be able to access the services and the resources necessary to support its business needs may be available.

Figure 2:
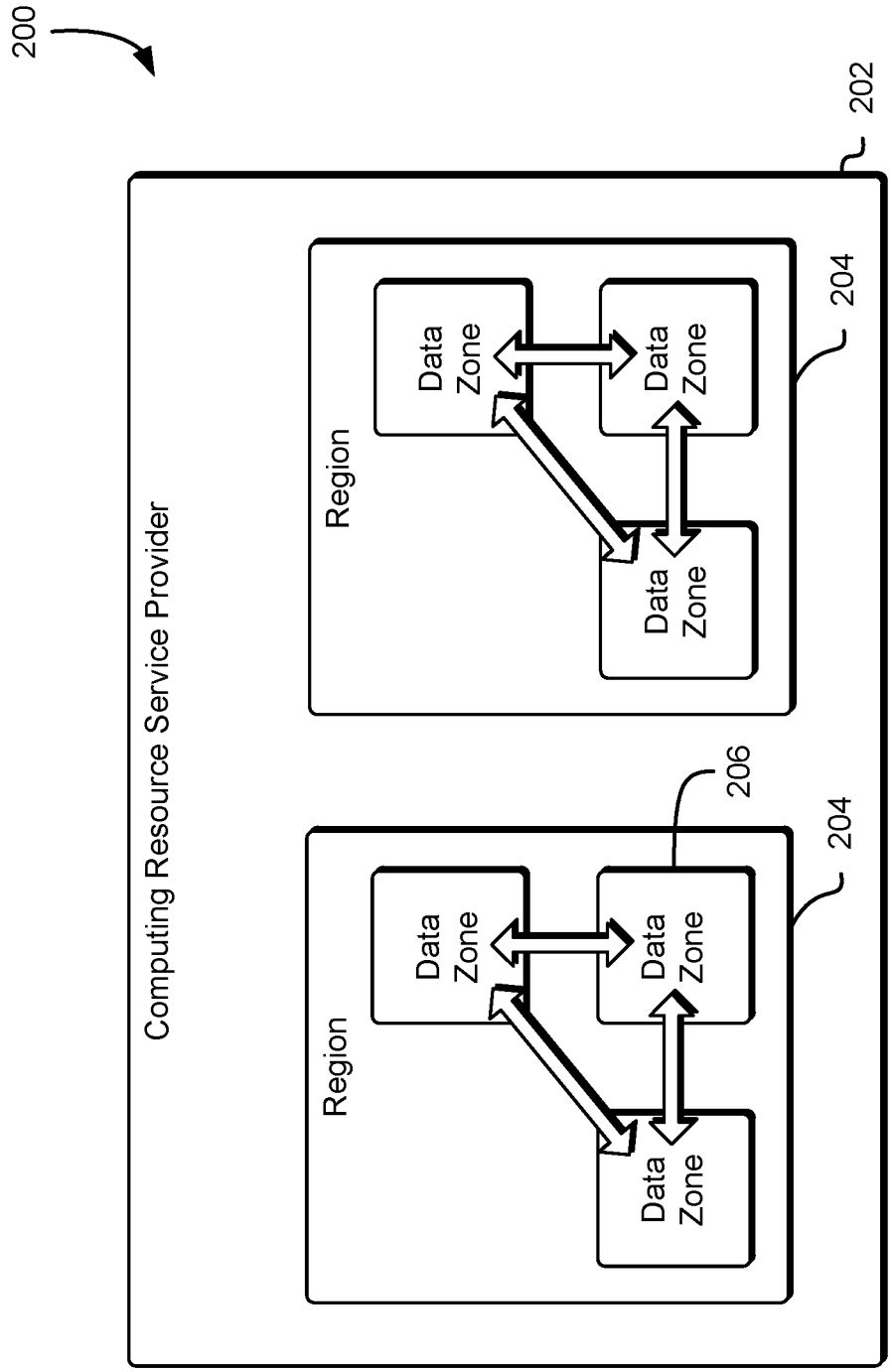
FIG. 2 shows an illustrative example of an environment in which various embodiments can be implemented.

As noted above, the computing resource service provider may maintain one or more data regions, which in turn may comprise one or more data zones for providing a number of services to the customer and for allowing the customer to generate and maintain resources necessary to support its business needs. Accordingly, FIG. 2 is an illustrative example of an environment 200 in which various embodiments can be implemented. As noted above, the computing resource service provider 202 may host a variety of services in multiple locations worldwide. Accordingly, each of these locations may include one or more data regions 204, which may be used by customer to access the services provided by the computing resource service provider 202 and to generate a variety of resources that may be used to support its business. For instance, a customer may access a data region 204 in order utilize a virtual computing system service to initiate a virtual machine instance. Accordingly, this virtual machine instance may be instantiated within that particular data region 204 and thus may be independent from any other virtual machine instances in another data region. Thus, if a customer accesses a second data region 204, the resource that may have been generated in the first data region may not be available in this second data region.

Each independent data region 204 may comprise a number of isolated locations, or data zones 206, which may be designed to be isolated from other data zone failures. Each data zone 206 within a data region 204 may be connected through one or more links which may allow a customer to generate one or more replicas of the customer's resources in other data zones within the data region. Thus, if there is a failure of one data zone 206 within a data region 204, the resources may still be available through a different data zone. In order to maintain this isolation, each data zone 206 may operate using its own distinct infrastructure (e.g., servers, power supplies, cooling systems, networking systems, security systems, etc.) which may obviate the need to share common points of failure with other data zones within a data region 204. Thus, in the event of a failure of a particular data zone 206 (e.g., system failure, natural disaster, terrorism, etc.), other data zones within the data region 204 may not be affected.

However, if there is a significant failure resulting in the unavailability of a particular data region 204, the customer may need to access a different data region in order to access the services provided by a computing resource service provider 202 and the customer's resources. Accordingly, the customer may interact with a disaster recovery service in order to specify an alternative data region 204 in which its resources should be replicated in and the specific time parameters that should be complied with in order to minimize the impact of a regional failure. For instance, the customer may specify an RTO and RPO time period for which the resources should be restored and for how up-to-date the resources should be when restored, respectively. Thus, based at least in part on the RTO and RPO, the disaster recovery service may be configured to execute a recovery plan necessary to satisfy the RTO and RPO and accordingly transmit executable instructions to the services in the data region 204 to initiate the reproduction process. Thus, the services in the data region 204 may replicate the various customer resources and transfer these replicated resources to the alternative data region to support the disaster recovery scenario.

Figure 3:
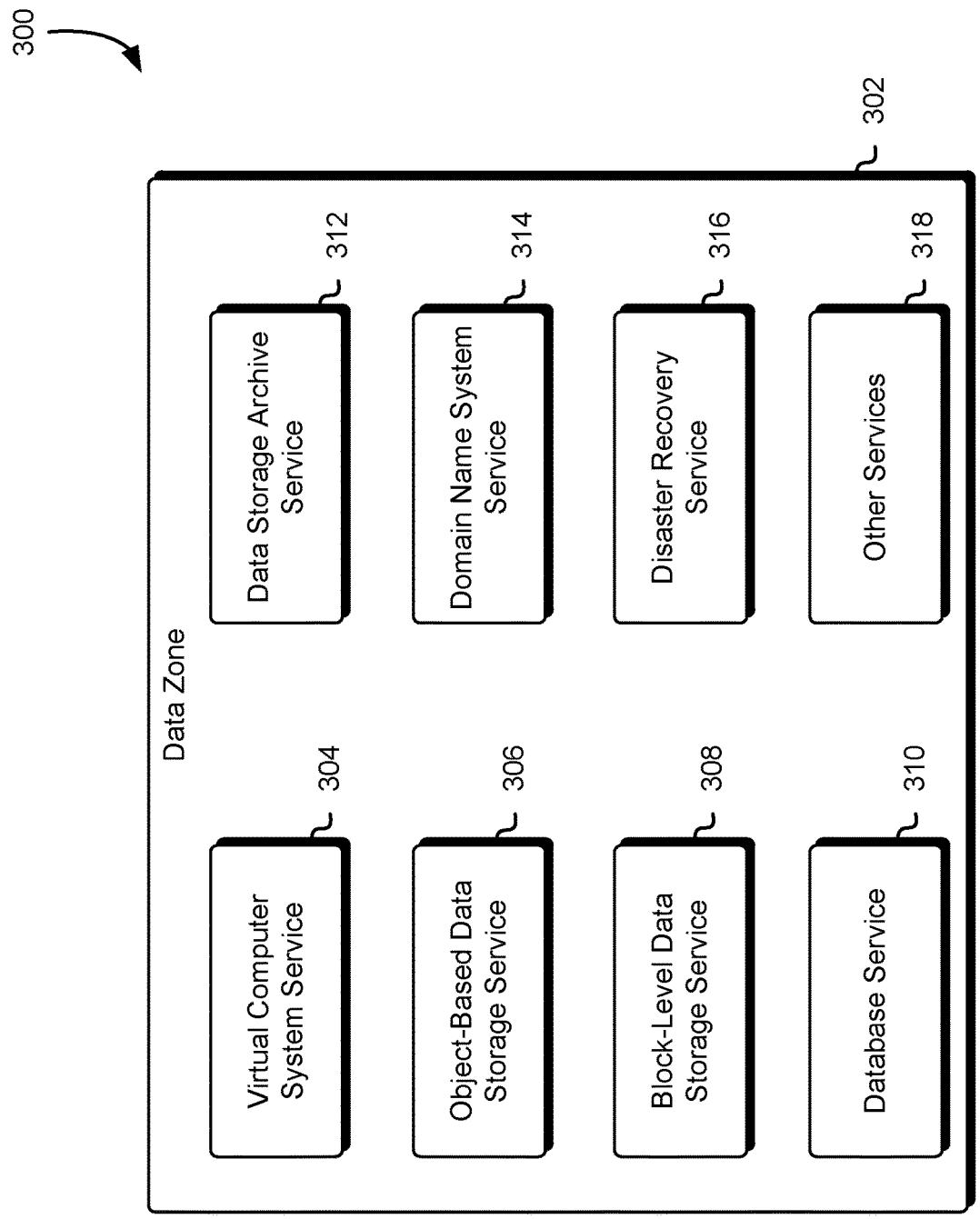
FIG. 3 shows an illustrative example of the one or more services that may be maintained and operated within a data zone according to at least one embodiment.

As noted above, each data zone may be configured to provide a number of services which may be used by a customer to support its business. Accordingly, FIG. 3 is an illustrative example 300 of the one or more services that may be maintained and operated within a data zone 302 according to at least one embodiment. In this illustrative example, the computing resource service provider may configure each data zone 302 to provide at least seven types of services. The services provided by the computing resource service provider that may be included in each data zone 302, in this example, include a virtual computer system service 304, an object-based data storage service 306, a block-level data storage service 308, a database service 310, a data storage archive service 312, a domain name service 314, a disaster recovery service 316 and one or more other services 318, although not all embodiments of the present disclosure will include all such services and additional services may be provided in addition to or as an alternative to services explicitly described herein. Each service may comprise an interface which may utilized by the customer to access computing resources that may be included in the respective service.

The virtual computer system service 304 may be a collection of computing resources configured to instantiate virtual machine instances onto virtual computing systems on behalf of the customers of the computing resource service provider. Customers of the computing resource service provider may interact with the virtual computer systems' service to provision and operate virtual computer systems that are instantiated on physical computing devices hosted and operated by the computing resource service provider. The virtual computer systems may be used for various purposes, such as to operate as servers supporting a website. Other applications for the virtual computer systems may be to support database applications, electronic commerce applications, business applications and/or other applications.

The object-based data storage service 306 may comprise a collection of computing resources that collectively operate to store data for a customer. The data stored in the object-based data storage service 306 may be organized into data objects. The data objects may have arbitrary sizes except, perhaps, for certain constraints on size. Thus, the object-based data storage service 306 may store numerous data objects of varying sizes. The object-based data storage service 306 may operate as a key value store that associates data objects with identifiers of the data objects which may be used by the customer to retrieve or perform other operations in connection with the data objects stored by the data storage service 306. Access to the data storage service may be through appropriately configured API calls.

The block-level data storage service 308 may comprise a collection of computing resources that collectively operate to store data for a customer. For instance, the block-level data storage system may be configured to provide block-level data storage volumes for use with a virtual machine instance, as noted above. A customer may interact with the block-level data storage service 308 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The database service 310 may be a collection of computing resources that collectively operate to run one or more databases for one or more customers. Customers of the computing resource service provider may operate and manage a database from the database service 310 by utilizing appropriately configured API calls. This, in turn, may allow a customer to maintain and potentially scale the operations in the database.

The data storage archive service 312 may comprise a collection of computing resources that collectively operate to provide storage for data archiving and backup of customer data. The data storage archive service 312 may thus be configured to persistently store data that may be infrequently accessed and for which long retrieval times are acceptable to a customer utilizing the service. A customer may interact with the data storage archive service 312 to generate one or more archives. Each archive may represent one or more data files that may be combined to form the archive. Accordingly, a customer, through appropriately configured API calls to the service, may upload and retrieve archives from the data storage archive service 312 and monitor the retrieval of these archives, as each retrieval job may typically require several hours to complete.

The Domain Name System (DNS) service 314 may be designed to give customers a method to route end users to one or more communications network applications. For instance, the DNS service 314 may be configured to translate human-readable names, such as uniform resource locators (URLs), into numeric Internet Protocol (IP) addresses that computer systems may use to connect to each other over the Internet. Thus, the DNS service 314 may be configured to connect requests to access one or more services provided by the computing resource service provider to the infrastructure that is operating within a data zone 302. The DNS service 314 may additionally be configured to route customers of the computing resource service provider to infrastructure outside of the data zone 302, such as another computing system operated by a separate provider.

The disaster recovery service 316 may be designed to allow a customer to generate a disaster recovery scenario to provide redundant availability of customer resources in the event of a regional failure. Accordingly, the disaster recovery service 316 may comprise a management layer over the other existing services provided by the computing resource service provider to its customers. This service 316 may operate in each data zone 302 within a data region to ensure the availability of the service in the event of a data zone failure or a data region failure. For instance, if a customer maintains one or more resources in a particular data region, the computing resource service provider may utilize the DNS service 314 described above to direct the customer to an instance of the disaster recovery service 316 in an objective data region. This may allow the customer to not only generate a disaster recovery scenario but also maintain access to the disaster recovery service if there is a regional failure.

The disaster recovery service 316 may be configured to generate one or more graphical user interfaces (GUIs) which may be used by the customer to interface with the service. These GUIs may enable the customer to specify the particular RTO and RPO time periods necessary to prevent substantial impact to the customer's business in the event of a regional failure. Additionally, the GUIs may also enable the customer to specify the resources that should be included in the disaster recovery scenario for failover purposes. Thus, any specified resources may be reproduced and transmitted to an alternative data region of the customer's choosing. The customer may utilize the disaster recovery service 316 to test any disaster recovery scenario to ensure that the resources have been reproduced properly and that these resources are available within the RPO and RTO in the event of a regional failure.

In order to properly reproduce the customer resources specified, the disaster recovery service 316 may be configured to transmit one or more executable instructions to the affected services specified by the customer. These executable instructions may cause the affected services to reproduce these resources according to the particular configuration of each of the affected services. For instance, the virtual computer system service 304 described above may be configured to obtain a snapshot of an existing virtual machine instance. The snapshot may include the current operational state of the virtual machine instance at a given time, including information identifying an entry point for resumption of execution. This snapshot may be transferred to an alternative data region and activated in order to allow a customer to utilize the virtual machine instance upon a failover. The executable instructions may further cause the affected services to perform the reproduction of these resources according to the RPO and RTO provided by the customer. Thus, the affected services may be configured to determine the frequency for which actions should be taken to reproduce and transfer the existing resources to an alternative data region.

The disaster recovery service 316 may additionally be configured to consider a precedence of operations and the relationship (i.e., dependencies) between the various services and resources utilized by the customer to determine which resources may need to be reproduced first to support other resources. For instance, the disaster recovery service 316 may be configured to transmit executable instructions to the database service 310 to transfer one or more reproduced databases to the alternative data region that may be necessary to instantiate an existing virtual machine instance. Accordingly, once the databases have been transferred to the alternative data region, the disaster recovery service 316 may transmit executable instructions to the virtual computer system service 304 to obtain a snapshot of the instance and transfer this snapshot to the alternative data region. Thus, when the snapshot is used to activate the instance, the necessary databases may be available to support the instantiation of the instance.

The computing resource service provider may additionally maintain one or more other services 318 based on the needs of its customers. For instance, the computing resource service provider may maintain an account service which may comprise a collection of computing resources that collectively operate to maintain customer account information for each customer of the computing resource service provider. The account service may include, for example, the customer name, address, phone numbers, billing details and other personal identification information for each customer of the computing resource service provider. Additionally, the account service may include cryptographic keys or other credentials that may be used to verify that a customer has the proper authorization to access the one or more services provided by the computing resource service provider. Other services include, but are not limited to, authentication services and services that manage other services and/or other services.

Figure 4:
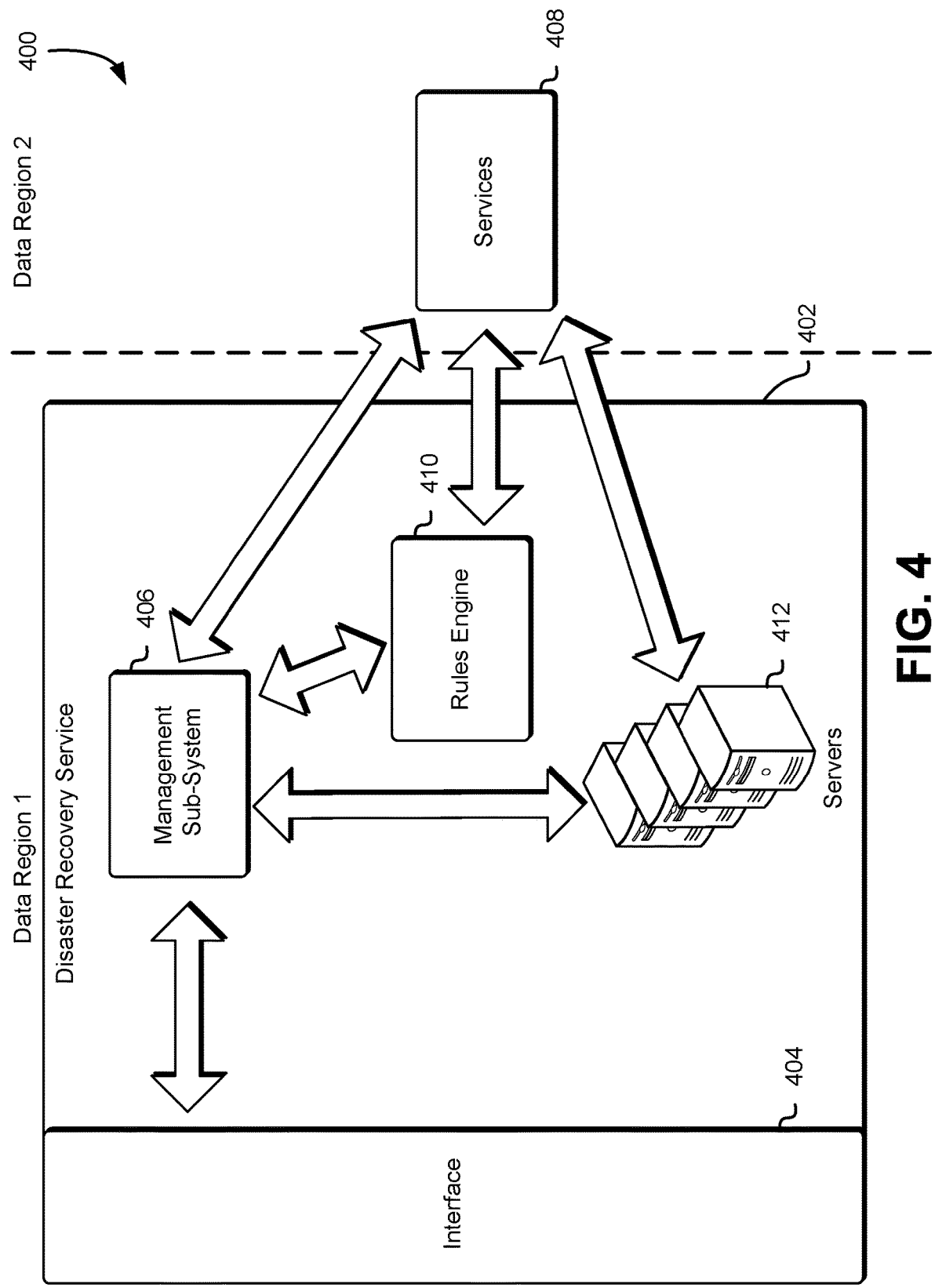
FIG. 4 shows an illustrative example of one or more components that may comprise the disaster recovery service in accordance with at least one embodiment.

As noted above, the disaster recovery service may be configured to obtain one or more parameters from a customer to generate one or more executable instructions that may be transmitted to a number of services in order to generate a disaster recovery scenario. Accordingly, FIG. 4 is an illustrative example 400 of one or more components that may comprise the disaster recovery service 402 in accordance with at least one embodiment. The disaster recovery service 402 may be configured to provide customers with an interface 404 that may enable a customer to access the disaster recovery service. A customer may utilize the interface 404 through one or more communications networks, such as the Internet. The interface 404 may include certain security safeguards to ensure that the customer has authorization to access the disaster recovery service 402. For instance, in order to access the disaster recovery service 402, a customer may need to provide a username and a corresponding password when using the interface 404. Additionally, requests (e.g., API calls) submitted to the interface 404 may require an electronic signature generated using a cryptographic key such that the electronic signature is verifiable by the disaster recovery service 402, such as by an authorization system (not shown).

Figure 5:
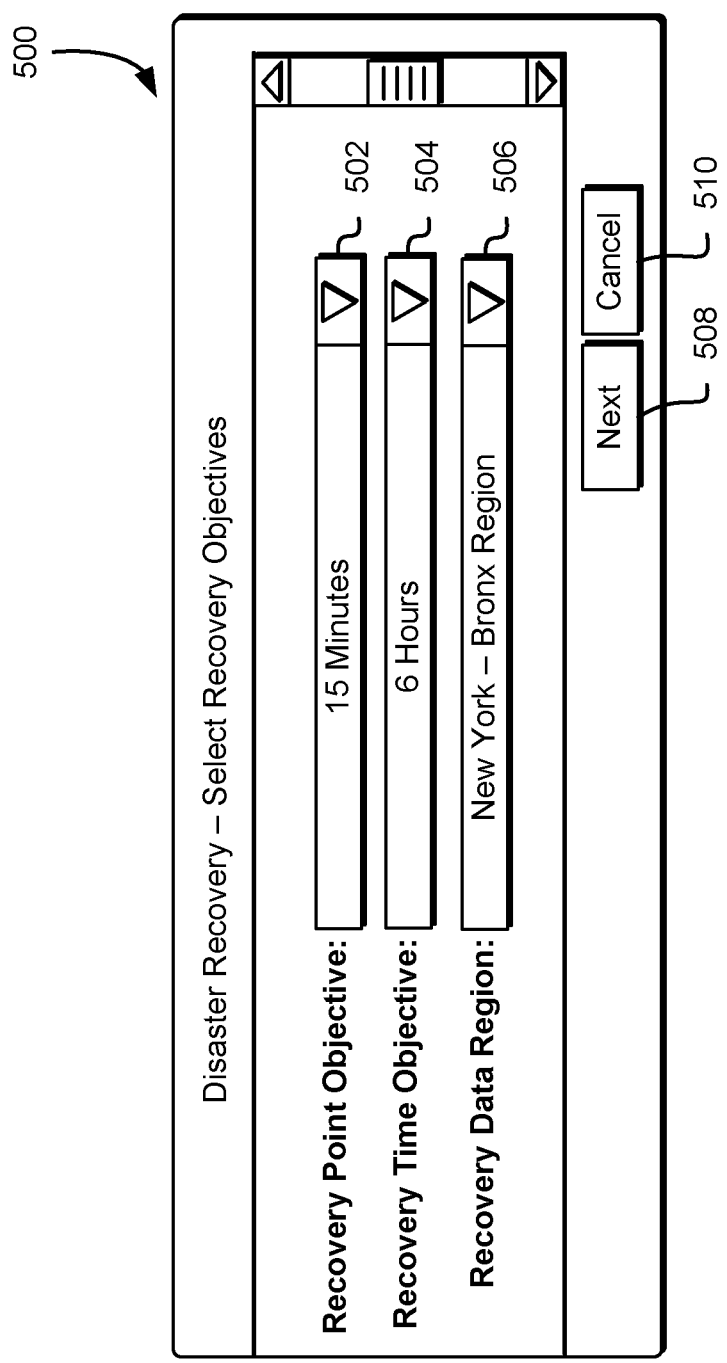
FIG. 5 shows an illustrative example of a graphical user interface for selecting one or more parameters for a disaster recovery scenario in accordance with at least one embodiment.
Figure 6:
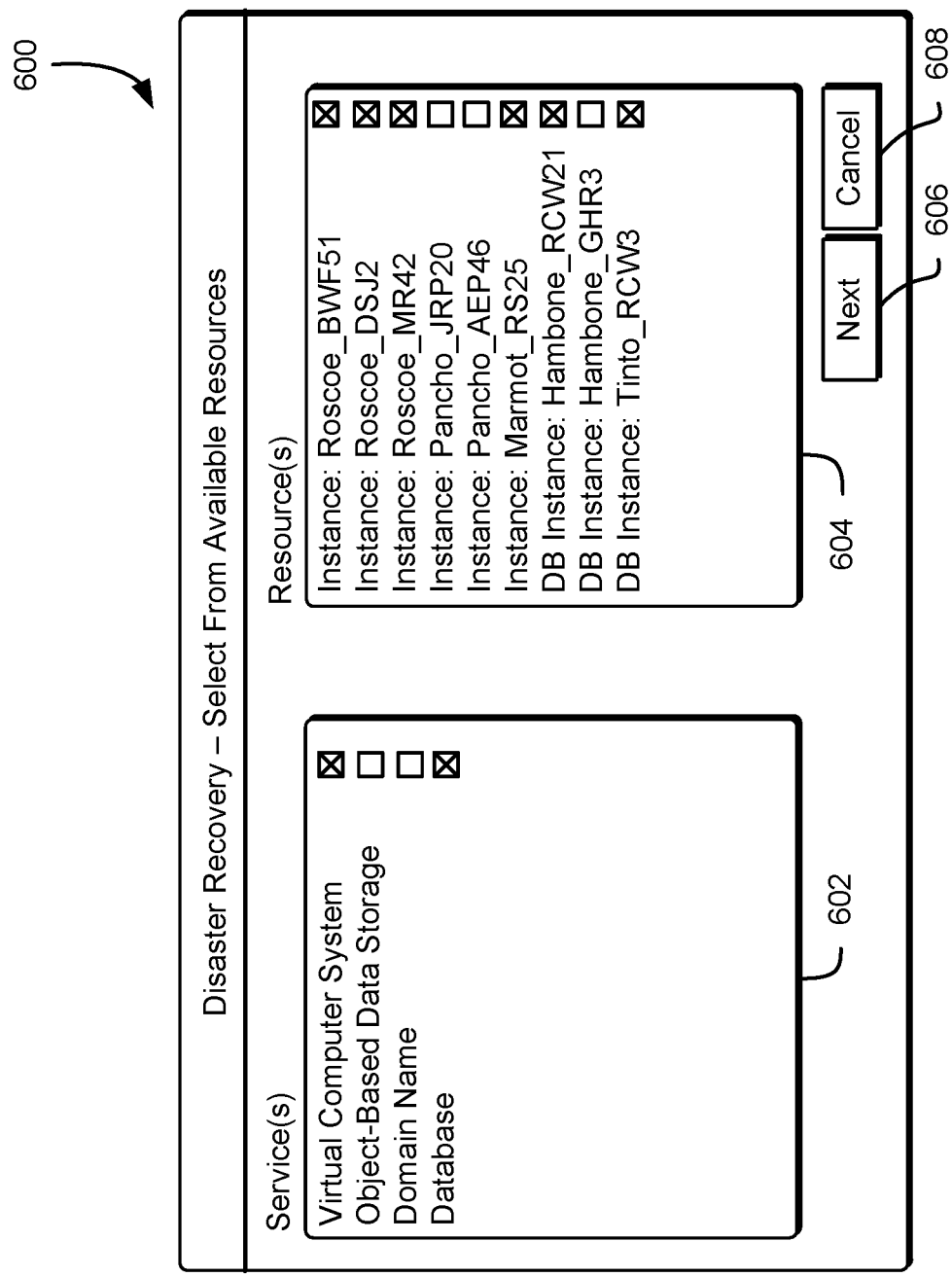
FIG. 6 shows an illustrative example of a graphical user interface for selecting one or more resources for a disaster recovery scenario in accordance with at least one embodiment.
Figure 7:
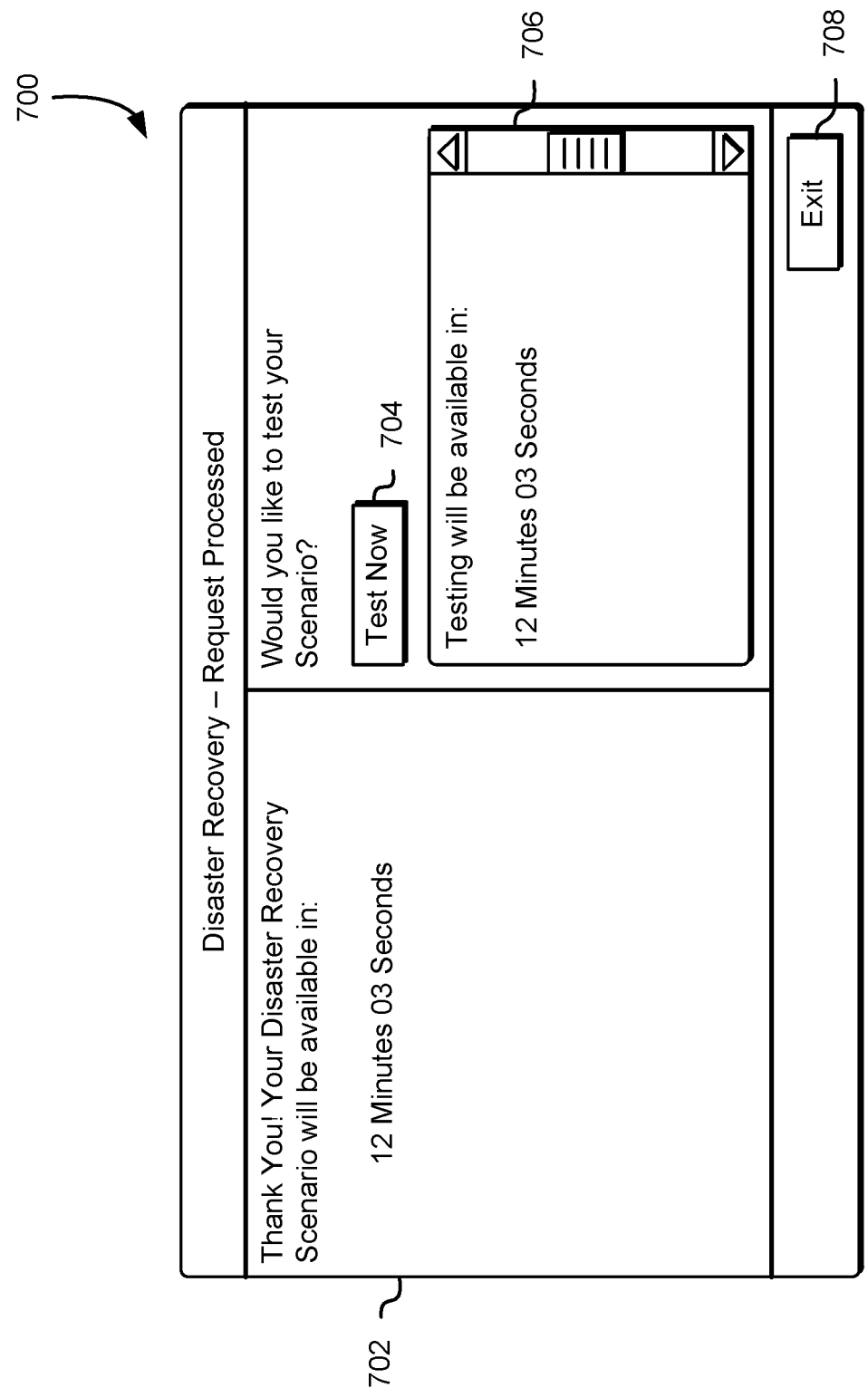
FIG. 7 shows an illustrative example of a graphical user interface for providing status of a disaster recovery scenario and testing the scenario in accordance with at least one embodiment.

As will be illustrated further in connection with FIGS. 5-7, the interface 404 may be configured to provide a customer with a GUI for providing one or more parameters necessary to create the disaster recovery scenario. For instance, the customer may use the GUI to specify the RTO and RPO time periods necessary to prevent significant impact to the customer's business operations and needs. Additionally, the customer may specify the resources necessary to support the failover process through the GUI. Once the disaster recovery scenario has been created, the disaster recover service 402 may allow the customer to utilize the interface 404 to test the disaster recovery scenario through the GUI, as illustrated in FIG. 7. Accordingly, the interface 404 may be configured to utilize the customer inputs from the GUI to generate and transmit one or more appropriately configured API calls to a management sub-system 406, which may be configured to generate and maintain the disaster recovery scenario. In an alternative embodiment, the customer may use the interface 404 to submit these API calls directly to the management sub-system 406 in order to generate the disaster recovery scenario.

The management sub-system 406 may receive the one or more appropriately configured API calls from the interface 404 and accordingly initiate the process to generate the disaster recovery scenario. For instance, the management sub-system may be configured to generate one or more executable instructions that may be tailored to the particular services 408 specified by the customer through the interface 404. For example, as illustrated above, the management sub-system 406 may be configured to transmit one or more instructions to a virtual computing system service which may cause the virtual computing system service to obtain a snapshot of an existing virtual machine instance and transmit this instance to an alternative data region. As noted above, the disaster recover service 402 may be operated and maintained in an objective data region that is different from the data region the customer is currently using to access a variety of services 408 to support its business needs. Thus, the management sub-system 406 may be configured to transmit one or more instructions to a variety of services 408 located in the customer's data region.

The management sub-system 406 may also be configured to interact with a rules engine 410 in order to determine if any of the operations affecting the services 408 require prioritization or precedence in order to coordinate the various services and successfully create the disaster recovery scenario. For instance, the rules engine 410 may be configured to interact with the services 408 the customer utilizes to determine whether any of the customer resources require other resources to operate. For example, as illustrated above, a virtual machine instance may require that one or more databases be present in order to operate properly. Accordingly, the rules engine 410 may maintain precedence for the customer databases to be reproduced and transferred to the alternative data region prior to instantiating the virtual machine instance in this alternative data region. Additionally, if the customer did not specify these databases using the interface 404, the rules engine 410 may be used to locate these additional necessary resources for supporting the customer-specified resources that are to be included in the disaster recovery scenario.

The management sub-system 406, based at least in part on the parameters specified by the customer through the interface 404 (e.g., RPO and RTO), may provision one or more servers 412 for tracking certain metrics during the failover process (e.g., reproducing and transmitting resources from one data region to an alternative data region) and providing the necessary capabilities and coordination necessary for the various services 408 to reproduce and transmit customer resources to the alternative data region. For example, if the customer provides short RPO and RTO time periods (e.g., the resources should comprise near current data and should be made available within a short period of time upon a failure), the management sub-system 406 may be configured to provision a significant amount of servers 412 to the services 408 in order to support the reproduction of the resources and support the failover process in the event of a failure. Alternatively, if the customer specifies longer RPO and/or RTO time periods, the management sub-system 406 may be configured to provision fewer servers 412 to support the various services 408.

In the event of a data region failure, the management sub-system 406 may be configured to monitor the alternative data region to ensure that the customer resources have been failed over according to the provided RPO and RTO time periods. Additionally, the management sub-system 406 may be configured to interact with a DNS service, as illustrated in FIG. 3, to resolve any customer requests to the services 408 to the alternative data region where the resources have been reproduced. The management sub-system 406 may be configured to transmit one or more executable instructions to the interface 404 which may cause the interface to provide information to the customer with regard to the data region failure and the status of the disaster recovery scenario.

FIGS. 5-7 are illustrative examples of a series of GUIs that may be provided by the disaster recovery service to a customer through an interface, as illustrated in FIG. 4. The customer may access the interface, and accordingly the GUIs, in a variety of ways. For instance, the GUI can be provided by an application on a computer system, an application on a telephone, or by one or more web servers wherein the GUIs may be viewed through a browser. The examples provided above are used for the purpose of illustration and it should be noted that the present disclosure includes other methods for presentation of the GUIs.

As noted above, the disaster recovery service may be configured to provide the customer with a GUI which may be used to specify one or more parameters for the creation and maintenance of a disaster recovery scenario. Accordingly, FIG. 5 is an illustrative example of a GUI 500 for selecting one or more parameters for a disaster recovery scenario in accordance with at least one embodiment. The GUI 500 may include a recovery point objective (RPO) input field 502 for specifying the RPO time period for recovery of the particular customer resources.

As noted above, the RPO may correspond to the maximum tolerable period in which data might be lost as a result of a data region failure. For instance, as illustrated in FIG. 5, if a customer specifies that the RPO should be set to fifteen minutes, the disaster recovery service may be configured to coordinate with the various services utilized by the customer to maintain the customer resources to continuously maintain reproductions of these resources according to the RPO. The RPO input field 502 may be configured to include options for the RPO time period in varying units of time (e.g., seconds, minutes, hours, days, etc.). Alternatively, the RPO input field 502 may be configured to allow a customer to input his/her own time period according to certain criteria. For instance, a customer may be required to utilize only alphanumeric characters when inputting a time period into the RPO input field 502.

Additionally, the GUI 500 may include a recovery time objective (RTO) input field 504 for specifying the RTO time period for recovery of the particular customer resources. As noted above, the RTO may correspond to the duration of time within which customer resources must be restored upon a data region failure in order to avoid significant impact to the customer's business operations and needs. For instance, as illustrated in FIG. 5, if a customer specifies that the RTO should be set to six hours, the disaster recovery service may be configured to coordinate with the various services utilized by the customer to ensure the disaster recovery scenario can be activated and all resources made available to the customer within the six hour RTO. As with the RPO input field 502 described above, the RTO input field 504 may be configured to include options for the RTO time period in varying units of time. Alternatively, the RTO input field 504 may be configured to allow a customer to input his/her own time period according to certain criteria (e.g., only alphanumeric characters are permitted, etc.).

In addition to the RPO input field 502 and the RTO input field 504, the GUI 500 may be configured to allow a customer to specify an alternative data region (e.g., recovery data region) where the reproduced resources should be transferred to in order to support the disaster recovery scenario. Accordingly, the GUI 500 may include a recovery data region input field 506. The recovery data region input field 506 may be configured to include a drop-down menu that, with customer interaction with the field, may present other data regions that may be used to support the disaster recovery scenario. For example, as illustrated in FIG. 5, the customer may specify that resources should be reproduced and transferred to the "New York-Bronx Region" recovery data region. This region may be different from the data region where the customer's resources are currently stored and used from. Thus, the recovery data region input field 506 may be configured to omit the current data region used by the customer to support its existing resources. Additionally, the choice of a recovery data region may dictate the objective data region that is used to provide the disaster recovery service for the customer. For instance, if the customer selected the "New York-Bronx Region" from the recovery data region input field 506, any subsequent interactions with the disaster recovery service may be directed to the service within a data region that is different from both the original data region used to persistently store and maintain the customer's resources and the recovery data region specified in the recovery data region input field.

Once the customer has provided a valid RPO, RTO, and recovery data region for the disaster recovery scenario, the customer may use a next button 508 to proceed to the next GUI and select their resources for reproduction, as will be described below in connection with FIG. 6. In an embodiment, if the customer has not provided a valid RPO, RTO, or recovery data region, using the next button 508 may cause a customer interface to generate a separate GUI that may include an error message indicating that one or more inputs are invalid. Thus, the customer may need to provide valid entries for the RPO, RTO, and recovery data region in order to continue. Alternatively, the customer may use a cancel button 510 to terminate the GUI 500 and cancel the creation of a disaster recovery scenario.

As noted above, the disaster recovery service may incorporate a GUI for which may be used by a customer to select one or more resources that may be included in the disaster recovery scenario. Accordingly, FIG. 6 is an illustrative example of a GUI 600 for selecting one or more resources for a disaster recovery scenario in accordance with at least one embodiment. The GUI 600 may be introduced to the customer upon selecting the RPO, RTO, and recovery data region and subsequently using the next button illustrated in FIG. 5. The GUI 600 may include a service selection window 602 which may be configured to list the one or more services a customer may currently use to support its business needs. Thus, the customer may use the service selection window 602 to select one or more services that may include resources necessary for the creation of the disaster recovery scenario. For example, as illustrated in FIG. 6, the customer may specify that he/she wants to generate a disaster recovery scenario using the virtual computer system service and a database service. It should be noted that the services listed in FIG. 6 is not an exhaustive list of services provided by a computing resource service provider and, as described in connection with FIG. 3 above, the computing resource service provider may operate and maintain a variety of different services for customer use.

The GUI 600 may additionally include a resource selection window 604 which may be configured to list the one or more resources associated with the one or more services selected in the service selection window 602. For instance, when a customer selects a service using the service selection window 602, the GUI 600 may display the one or more customer resources associated with the selected service on the resource selection window 604. Thus, the disaster recovery service may be configured to access the selected services to identify and locate any relevant customer resources that may be included in these selected services. The disaster recovery service may be configured to transmit executable instructions to an interface, as described in FIG. 4, which may cause the interface to display these resources through the GUI 600. Accordingly, the customer may select one or more resources from the resource selection window 604 that may be included in the disaster recovery scenario. Additionally, in an embodiment, the GUI 600 may be configured to automatically select any other resources that may be necessary to support the resources the customer has selected. This may support the coordination of the failover process and minimize the downtime of any services and resources necessary to support the customer's business needs.

Once the customer has selected the services and associated resources that may be included in the disaster recovery scenario, the customer may use the next button 606 to initiate the creation of the disaster recovery scenario and proceed to the next screen. Accordingly, the disaster recovery service may obtain the list of selected services and resources from the GUI 600 and proceed to interact with a rules engine and the selected services to generate one or more executable instructions which may cause the selected service to initiate reproduction of the resources selected by the customer and any other resources necessary to support the customer-selected resources. Additionally, the disaster recovery service may be configured to allocate a number of servers necessary to generate and support the disaster recovery scenario. As noted above, the servers selected for this process may depend upon the customer-specified RPO, RTO, and resources selected using the GUI described in FIG. 5 and the GUI 600.

The GUI 600 may additionally include a cancel button 608. The cancel button 608 may provide a customer an option to terminate the GUI 600 and to cease the creation of the disaster recovery scenario. For instance, if the customer wishes to modify the RPO, RTO, or recovery data region, the customer may use the cancel button 608 to close the GUI 600 and initiate the process of creating a disaster recovery scenario anew. While the use of a next button 606 and a cancel button 608 is used extensively throughout the present disclosure for the purpose of illustration, the GUI 600 may include additional buttons. For instance, the GUI 600 may include a back button which may allow a customer to return to the GUI illustrated in FIG. 5 to make additional modifications to the parameters for the disaster recovery scenario.

Once the customer has completed selecting the services and resources necessary to create the disaster recovery scenario and has acknowledged this selection, the customer may be presented with an additional GUI illustrating the status of the disaster recovery scenario. Accordingly, FIG. 7 is an illustrative example of a GUI 700 for providing status of a disaster recovery scenario and testing the scenario in accordance with at least one embodiment. The GUI 700 may include a scenario status screen 702 which may be configured to display the status of the disaster recovery scenario being created. For instance, as illustrated in FIG. 7, the scenario status screen 702 may be configured to display the estimated amount of time remaining until the disaster recovery scenario is completed. The scenario status screen 702 may additionally be configured to display other useful information. For example, the scenario status screen 702 may be configured to display the status of any reproduced resources and any relevant metrics, such as estimated RPO for the resources. Thus, the customer may use the scenario status screen 702 to ensure that the resources have been reproduced properly and according to the customer's specifications. The scenario status screen 702 may be used to display other metrics depending on the configuration of the GUI 700.

The GUI 700 may additionally include a testing button 704 which may be used by a customer to initiate a test of the disaster recovery scenario. For instance, if the customer uses the testing button 704 to initiate a test, the interface may transmit one or more API calls to the management sub-system to initiate the failover process and transmit test data to the services in the alternative data region (e.g., customer-specified recovery data region) where the reproduced customer resources may reside. Accordingly, the management sub-system may evaluate the failover process to ensure that the process satisfies the RPO and RTO specified by the customer.

Thus, the GUI 700 may additionally include a testing status window 706 for displaying relevant failover metrics. For instance, once the customer has used the testing button 704, the testing status window 706 may be configured to display metrics associated with the failover process. For example, the testing status window 706 may be configured to display the corresponding RPO for each resource reproduced in the recovery data region. Thus, the customer may verify that the RPO has been satisfied. Additionally, once the test is complete, the testing status window 706 may display the amount of time that was required to complete the failover process and provide a comparison of this amount of time and the RTO. This may allow a customer to verify that the failover process additionally complies with the RTO. The testing status window 706 may be configured to display additional information, such as metrics related to the latency of the connection and available network bandwidth. In this illustrative example, the testing status window 706 may display that testing cannot be performed until the disaster recovery scenario has been created. Thus, using the testing button 704 may not initiate a test.

The GUI 700 may additionally include an exit button 708 for terminating the GUI. Thus, once the customer has completed testing or is satisfied that the disaster recovery scenario has been created properly, the customer may use the exit button 708 to terminate the GUI 700 and resume using the various services and resources necessary to support its business. It should be noted that at any point, the customer may use the interface, as described in FIG. 4, to access the GUI 700 and perform additional tests on the created disaster recovery scenario. Additionally, the GUIs described in FIGS. 5-7 may be accessed in order for the customer to modify an existing disaster recovery scenario.

Figure 8:
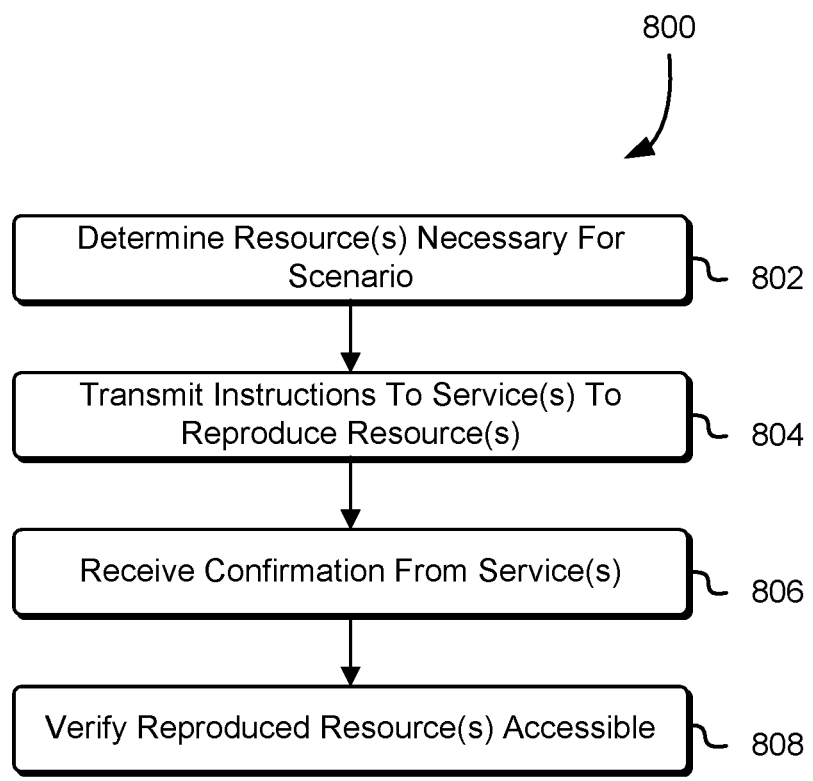
FIG. 8 shows an illustrative example of a process for creating a disaster recovery scenario in accordance with at least one embodiment.

FIG. 8 is an illustrative example of a process 800 for creating a disaster recovery scenario in accordance with at least one embodiment. The process 800 may be performed by a properly configured management sub-system component within the disaster recovery service. As described above in connection with FIG. 6, a customer may use a GUI provided by an interface of the disaster recovery service to specify the one or more resources that should be included in the disaster recovery scenario. These customer-specified resources may require additional resources to support the reproduction and operation of the customer-specified resources in the alternative data region. Accordingly, the management sub-system may be configured to determine 802 the one or more resources necessary to create the disaster recovery scenario.

As noted above, the management sub-system may be configured to interact with the various services provided by the computing resource service provider, along with a rules engine, to determine the relationship between the customer-specified resources and any other resources that may support the customer-specified resources. Additionally, the management sub-system may be configured to evaluate any precedence that must be considered when reproducing the resources necessary to create the disaster recovery scenario. For example, if a customer using the GUI specifies that a particular virtual machine instance should be reproduced and operational in the alternative data region, the management sub-system may interact with the virtual computing system service to evaluate this virtual machine instance and determine whether any additional resources are necessary to instantiate the virtual machine instance. Thus, if the management sub-system identifies any additional resources, and determines that these additional resources must be present prior to instantiation of the virtual machine instance, the management sub-system may consider this precedence.

Accordingly, the management sub-system may be configured to generate and transmit 804 executable instructions to the one or more affected services to initiate the reproduction of the resources necessary to create the disaster recovery scenario. As noted above, the management sub-system may be configured to consider the relationship and precedence that may exist between a number of resources associated with one or more services provided by the computing resource service provider. Thus, the management sub-system may be configured to interact with a rules engine to generate a set of instructions that may be transmitted to the one or more services to support the creation of the disaster recovery scenario. For instance, using the example above, the management sub-system may be configured to transmit executable instructions to a database service which may cause the database service to reproduce and transfer one or more databases to the recovery data region. These databases may be necessary to support one or more virtual machine instances. Thus, once the databases are present in the recovery data region, the management sub-system may transmit one or more executable instructions to the virtual computer system service to reproduce and transfer one or more virtual machine instances to the recovery data region.

The executable instructions generated by the management sub-system may be configured to be compatible with the affected service. For instance, the executable instructions, when received by a virtual computer system service, may cause the virtual computer system service to obtain a snapshot for each of the one or more selected virtual machine instances. These snapshots may then be transferred to the recovery data region where the virtual computer system service in that recovery data region may use the snapshot to instantiate the one or more virtual machine instances. In this manner, an affected service may perform the reproduction and transfer of the selected resources according to its own configuration.

Once the necessary resources have been reproduced and transferred to the recovery data region, the one or more services from both the original data region and the recovery data region may provide confirmation that the process has been performed. Accordingly, the management sub-system may receive 806 confirmation from the one or more affected services that the resources have been reproduced and transferred successfully. It should be noted that the management sub-system may not receive confirmation from the one or more affected services if there was a problem in the reproduction and transfer of the necessary resources to create the disaster recovery scenario. For instance, the recovery data region specified may be at capacity and may be unable to persistently store the necessary resources to support the disaster recovery scenario. Alternatively, the one or more services in the original data region may be unable to reproduce the necessary resources. Thus, the process 800 may terminate if confirmation is not received, which may cause the management sub-system to interact with the interface to inform the customer of the issue.

Once the management sub-system has received confirmation from the one or more services on both the original data region and the recovery data region, the management sub-system may proceed to verify 808 that the reproduced resources in the recovery data region are accessible. As noted above, the customer may specify an RPO for the various resources. Thus, the management sub-system may be configured to compare the reproduced resources to the source resources to ensure that the reproduced resources satisfy the RPO requirement. Additionally, the management sub-system may be configured to perform one or more actions that may involve these reproduced resources. For instance, the management sub-system may be configured to activate the reproduced virtual machine instance to ensure that it is operational and ready for customer use. The verification of the reproduced resources may be performed one or more times over time to ensure that these resources satisfy the RPO and RTO requirements specified by the customer.

Figure 9:
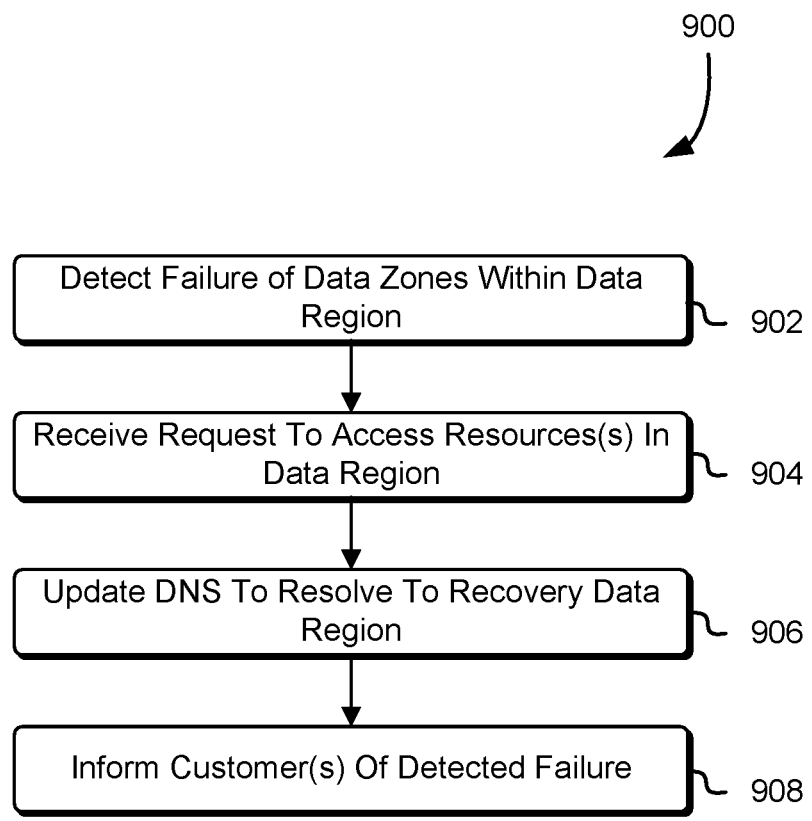
FIG. 9 shows an illustrative example of a process for failing over to an alternative data region in the event of a region failure in accordance with at least one embodiment.

Upon a failure of a data region, the disaster recovery service may perform one or more operations to ensure that a customer that has utilized the disaster recovery service to generate a disaster recover scenario is able to access his/her resources. Accordingly, FIG. 9 is an illustrative example of a process 900 for failing over to an alternative data region in the event of a region failure in accordance with at least one embodiment. As with the process illustrated in FIG. 8, the process 900 may be performed by a properly configured management sub-system included in a disaster recovery service. The management sub-system may be configured to observe all other data regions to determine whether a data region is experiencing a failure. The computing resource service provider may provide certain parameters for determining when a regional failure occurs. For instance, a data region may be considered to have failed if two or more data zones within the data region are unavailable or have failed in some other way. The parameters for determining when a regional failure occurs may additionally be more complex. For instance, a data region may be considered to have failed if one or more performance metrics (e.g., latency, processing speed, etc.) corresponding to the particular resources do not meet a certain threshold across a number of data zones within the data region. Thus, the management sub-system may be configured to detect 902 a failure of a number of data zones within a data region. Thus, if a certain number of data zones have failed, the management sub-system may determine that the entire data region has failed and initiate the failover process to activate the disaster recovery scenario for each customer affected.

At any point during the failover process, the management sub-system may receive 904 one or more requests from a customer to access one or more resources in the failed data region. For instance, upon detection of a regional failure, the disaster recovery service may be configured to interact with a DNS service to redirect any requests to the disaster recovery service. Thus, the management sub-system may use these requests to identify the particular customer resources that may have been reproduced and identify the associated recovery data region for the disaster recovery scenario.

Once the management sub-system has identified the applicable recovery data region that comprises the reproduced resources requested by the customer, the management sub-system may update 906 the DNS to resolve to the recovery data region. For instance, if the URL provided by the customer originally corresponded to an IP address of a virtual computer system service in the failed data region, the management sub-system may interact with the DNS service to identify the IP address of the virtual computer system service in the recovery data region and associate the URL with this different IP address. Thus, the customer may automatically be redirected to the reproduced resources, subject to the disaster recovery scenario.

At a later point, the management sub-system may interact with the interface provided by the disaster recovery service to inform 908 the affected customers of the detected data region failure. For instance, the management sub-system may be configured to transmit one or more executable instructions to the interface that may cause the interface to display a GUI with relevant information regarding the data region failure and the steps taken to mitigate the impact of the failure. Additionally, the management sub-system may trigger an alarm or other notification system that may inform the affected customers of the failure.

It should be noted that the operations included in the process 900 may be performed in a different order. For instance, the management sub-system may be configured to inform 908 the affected customer of the detected data region failure immediately after the initial detection and prior to receiving 904 any requests to access one or more resources in the failed data region. Additionally, the management sub-system may be configured to update 906 the DNS to resolve to the recovery data region prior to receiving 904 any requests from a customer to access the one or more resources. This may allow the management sub-system to interact with the DNS service to automatically process any URLs to the recovery data region.

Figure 10:
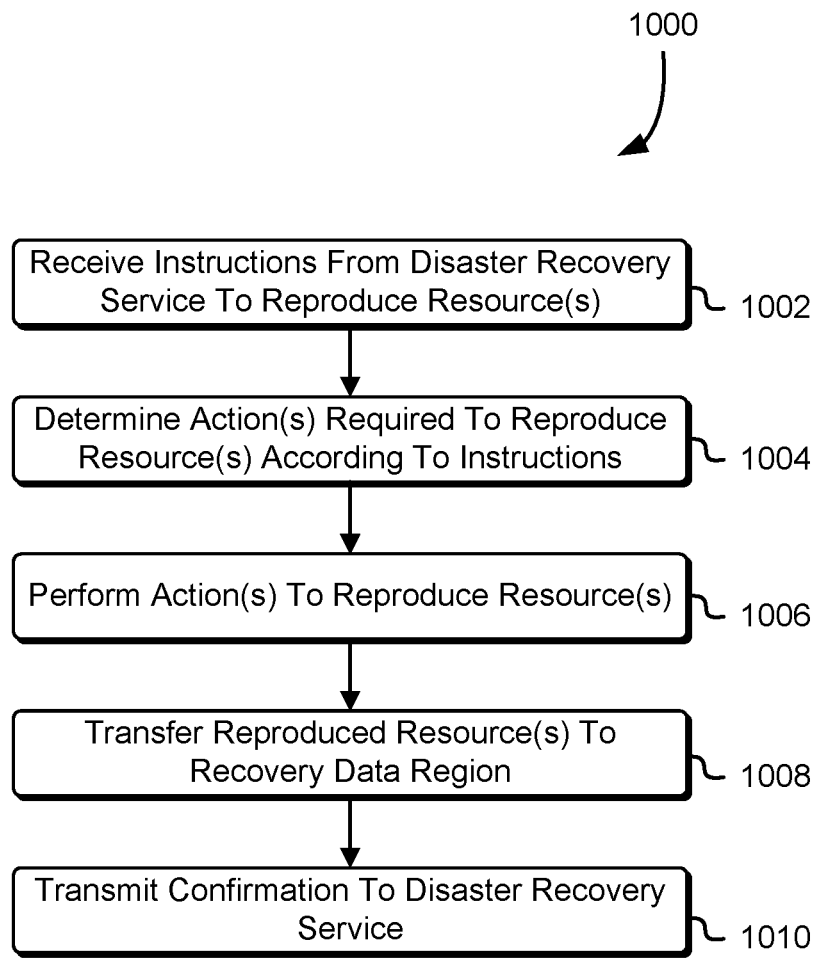
FIG. 10 shows an illustrative example of a process for reproducing resources and transmitting these resources to an alternative data region in accordance with at least one embodiment.

As noted above, the management sub-system component of the disaster recovery service may transmit one or more executable instructions to the one or more services comprising customer resources specified in the GUI. Accordingly, FIG. 10 is an illustrative example of a process 1000 for reproducing resources and transmitting these resources to an alternative data region in accordance with at least one embodiment. The reproduction of these resources may be performed by one or more services provided by a computing resource service provider as selected by a customer. A management sub-system of a disaster recovery service may generate a disaster recovery scenario based at least in part on services and associated resources selected by a customer through the use of an interface, as illustrated in FIG. 4. For instance, the interface may be configured to provide one or more GUIs, as illustrated in FIGS. 5-7, which may allow a customer to specify certain parameters for the disaster recovery scenario and the resources that must be reproduced to support the customer's business.

Accordingly, the management sub-system may use the selected services and resources to generate one or more executable instructions which may be transmitted to the various selected services for processing. Thus, a selected service may receive 1002 executable instructions from the disaster recovery service to initiate reproduction of one or more resources that the customer has specified. These instructions may include certain parameters necessary for the reproduction of the customer's resources and other resources necessary to support the failover process. For instance, the executable instructions may include an RPO and RTO time period that must be complied with in order to prevent significant impact to the customer's business.

Based at least in part on the parameters specified in the executable instructions and the specific resources selected by the customer for reproduction, the selected service may determine 1004 the one or more actions that may be required to reproduce the necessary resources. For instance, if the customer provides a short RPO time period, the executable instructions may cause the selected service to reproduce the necessary resources numerous times over a period of time to ensure that the RPO time period is satisfied. Additionally, each service provided by the computing resource service provider may reproduce a number of resources in varying ways, dependent upon the configuration of each service. For example, as illustrated above, a virtual computer system service may be configured to obtain a snapshot of an existing virtual machine instance. This snapshot may comprise the current state of the virtual machine instance when the snapshot was taken. This snapshot may then be transmitted to another data region for instantiation. In another example, an object-based data storage service may be configured to create a new logical data container to identify any reproduced resources. Accordingly, these reproduced resources may be quickly identified and transferred to the recovery data region. Once the selected service has determined the actions necessary to reproduce the resources, the selected service may perform 1006 these actions and accordingly reproduce the resources.

Once the necessary resources have been successfully reproduced, the selected service may be configured to transfer 1008 these reproduced resources to the recovery data region. As noted above, each data region may comprise a number of data zones. Each data zone may include a replica of the services provided by the computing resource service provider. Additionally, the executable instructions provided by the disaster recovery service may include the destination for any reproduced resources. Thus, the selected service may be configured to obtain the reproduced resource and transfer it to a particular data zone within the recovery data region that is to be used to support the failover process. Additionally, the selected service may be configured to receive confirmation from the recovery data region that the reproduced resources have been transferred successfully.

Once the reproduced resources have been transferred to the recovery data region, the selected service may transmit 1010 confirmation of the successful transfer to the disaster recovery service. As noted above, the disaster recovery service may be configured to verify that the reproduced resources are accessible upon receipt of confirmation. Thus, confirmation of the successful transfer of the reproduced resources may allow the disaster recovery service to continue testing the disaster recovery scenario and inform the customer that the scenario is ready in the event of a data region failure.

Figure 11:
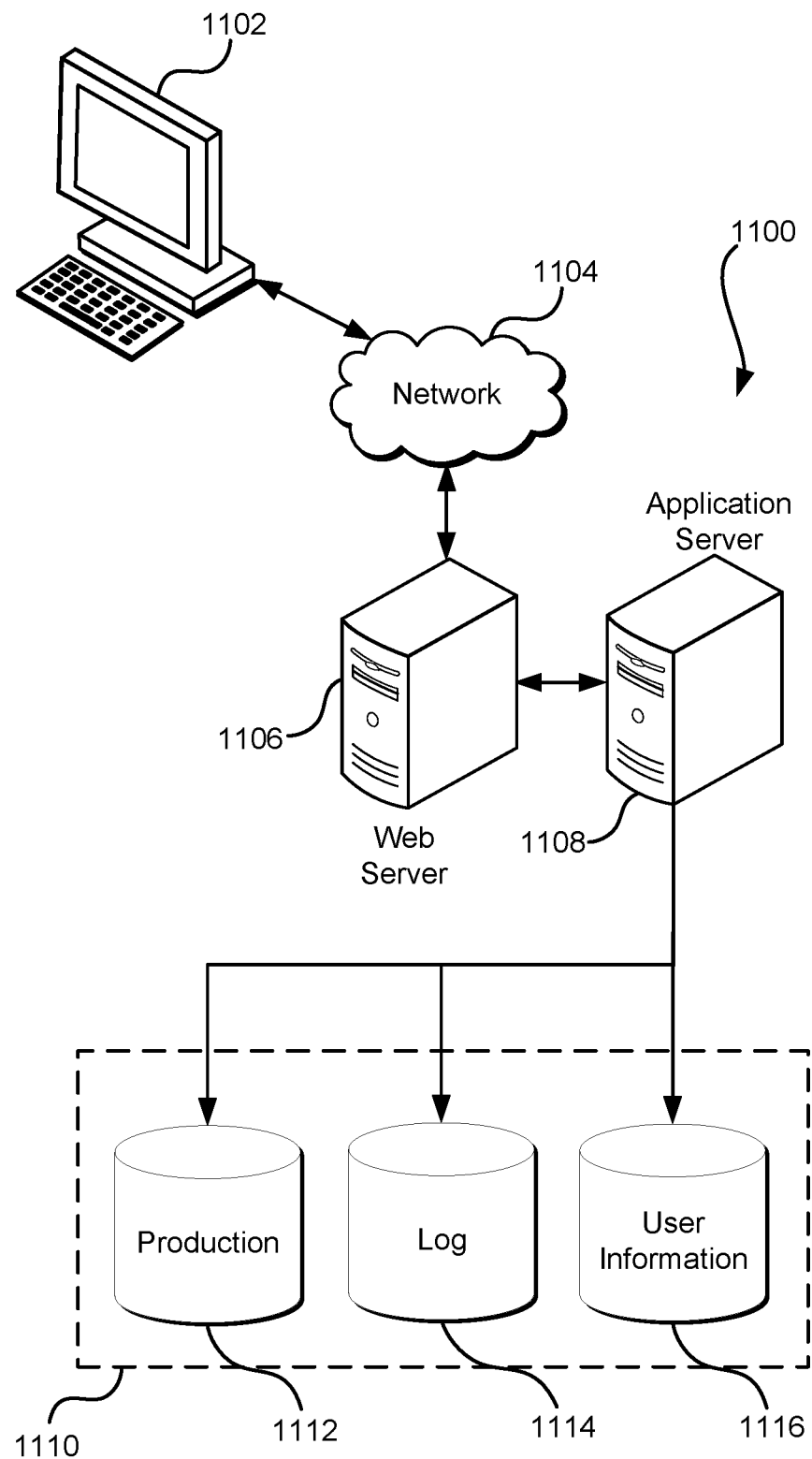
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium that can be used to store the desired information and that can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   generating, based at least in part on input received via a graphical user interface, parameters of a recovery plan for a failure event in a first data region prior to the failure event being detected; and
   configuring a system to monitor for a failure event and, as a result of a failure event being detected, causing failover to a failover data region by coordinating a selected set of one or more virtual machine computing resources based at least in part on dependencies among the selected set of one or more virtual machine computing resources, the failover to the failover data region being based at least in part on the parameters of the recovery plan, the parameters generated based at least in part on the input received via the graphical user interface prior to the detected failure event including a selection of the failover data region via the graphical user interface prior to the detected failure event.

2. The computer-implemented method of claim 1, wherein the recovery plan comprises a recovery time objective.

3. The computer-implemented method of claim 2, wherein the recovery time objective defines a duration of time for the one or more virtual machine computing resources to be restored as a result of the detected failure event.

4. The computer-implemented method of claim 1, wherein the recovery plan comprises a recovery point objective.

5. The computer-implemented method of claim 1, wherein the recovery plan comprises a selection of the one or more virtual machine computing resources hosted by one or more services of a computing resource service provider in the first data region, the virtual machine computing resources configured for instantiating at least one virtual machine.

6. The computer-implemented method of claim 1, wherein the recovery plan indicates the failover data region.

7. A computer system, comprising:
   a system to implement a recovery plan by at least:
      receiving an indication of a detected failure event in a first failover region; and
      causing, in response to the indication of the detected failure event in the first failover region, failover to a failover data region by coordinating a selected set of one or more virtual machine computing resources based at least in part on a recovery plan generated prior to the detected failure event, where parameters of the recovery plan are generated prior to the detected failure event via a graphical user interface and include a selection of the first failover region via the graphical user interface prior to the detected failure event.

8. The computer system of claim 7, wherein the selected one or more virtual machine computing resources are redundantly maintained based at least in part on dependencies among the selected one or more virtual machine computing resources to enable failover to the failover data region in compliance with recovery performance parameters in response to the detected failure event.

9. The computer system of claim 7, wherein the recovery plan comprises a selection of one or more virtual machine computing resources hosted by one or more services of a computing resource service provider in a first data region, the virtual machine computing resources configured for instantiating at least one virtual machine.

10. The computer system of claim 7, wherein the recovery plan comprises one or more recovery performance parameters.

11. The computer system of claim 7, wherein the recovery plan comprises dependencies among the selected one or more virtual machine computing resources.

12. The computer system of claim 7, wherein the recovery plan comprises a failover data region.

13. One or more non-transitory computer-readable storage media having collectively stored therein instructions that, if executed by one or more processors of a recovery service, cause the recovery service to:
   generate a recovery plan for a first data region, prior to a detected failure event, based at least in part on failover information including recovery parameters provided by a user through an interface, including a selection of a failover data region via the interface prior to the detected failure event; and
   coordinate failover preparation by at least transmitting one or more executable instructions to one or more services, causing one or more virtual machine computing resources to be redundantly maintained based at least in part on dependencies among the one or more virtual machine computing resources to enable failover from the first data region to the failover data region.

14. The one or more non-transitory computer-readable storage media of claim 13, wherein the failover information includes a selection of the one or more virtual machine computing resources hosted by the one or more services of a computing resource service provider in a first data region, the one or more virtual machine computing resources configured for instantiating at least one virtual machine.

15. The one or more non-transitory computer-readable storage media of claim 13, wherein the failover information includes a selection of the failover data region.

16. The one or more non-transitory computer-readable storage media of claim 13, wherein:
   the failover information includes a recovery time objective, the recovery time objective defining a duration of time for the one or more virtual machine computing resources to be restored as a result of a detected failure event; and
   the one or more virtual machine computing resources are redundantly maintained by the one or more services in accordance with the recovery time objective.

17. The one or more non-transitory computer-readable storage media of claim 13, wherein:
   the failover information further includes a recovery point objective, the recovery point objective defining a maximum amount of time in which customer data can be lost as a result of a detected failure event; and
   the one or more virtual machine computing resources are redundantly maintained by the one or more services in accordance with the recovery point objective.

18. The one or more non-transitory computer-readable storage media of claim 13, wherein the one or more processors of the recovery service are located in a third data region, the third data region different from the first data region and the failover data region.

19. The one or more non-transitory computer-readable storage media of claim 13, wherein the one or more virtual machine computing resources are redundantly maintained by the one or more services, the one or more services configured to reproduce and update the one or more virtual machine computing resources based at least in part on the failover information provided through the interface.

20. The one or more non-transitory computer-readable storage media of claim 13, wherein the instructions further cause the recovery service to cause failover to the failover data region in compliance with the failover information as a result of a failure event in the first data region.

* * * * *